United States Patent [19]

Fukushima et al.

[11] Patent Number: 5,217,844
[45] Date of Patent: Jun. 8, 1993

[54] OPTICAL RECORDING MEDIUM, METHOD OF PRODUCING THE SAME AND METHOD OF PRODUCING THE OPTICAL RECORDING CARD

[75] Inventors: Yoichi Fukushima; Minoru Fujita; Yuji Kakinuma, Tokyo, all of Japan

[73] Assignee: Kyodo Printing Co., Ltd., Tokyo, Japan

[21] Appl. No.: 439,383

[22] PCT Filed: Apr. 30, 1988

[86] PCT No.: PCT/JP88/00439
§ 371 Date: Nov. 8, 1989
§ 102(e) Date: Nov. 8, 1989

[87] PCT Pub. No.: WO88/09030
PCT Pub. Date: Nov. 17, 1988

[30] Foreign Application Priority Data

May 8, 1987 [JP] Japan .................. 62-111945

[51] Int. Cl.$^5$ .................. G03C 1/72; G03C 1/49; G03C 5/16
[52] U.S. Cl. .................. 430/273; 430/346; 430/508; 430/616; 430/944; 430/945; 430/964; 346/135.1
[58] Field of Search .............. 430/270, 495, 945, 346, 430/273, 616, 944, 964, 508, 945; 346/135.1

[56] References Cited

U.S. PATENT DOCUMENTS

| | | | |
|---|---|---|---|
| 4,259,424 | 3/1981 | Endo et al. | 430/616 |
| 4,314,260 | 2/1982 | Drexler | 430/616 |
| 4,363,870 | 12/1982 | Bouldin | 430/616 |
| 4,465,767 | 8/1984 | Oba et al. | 430/271 |
| 4,500,777 | 2/1985 | Drexler | 235/487 |
| 4,762,770 | 8/1988 | Bouldin et al. | 430/495 |
| 4,783,398 | 11/1988 | Takada et al. | 430/495 |

*Primary Examiner*—Richard L. Schilling
*Attorney, Agent, or Firm*—Martin A. Farber

[57] ABSTRACT

An optical recording medium includes a silver grain layer containing a large number of blackened fine silver grains and a coloring matter layer containing coloring matter on a base board and the coloring matter has an ability of absorbing near-infrared ray. When laser beam having a density of optical energy more than a boundary which represents a threshold with respect to the density of optical energy is radiated to the optical recording medium, a part of the latter is deformed to form a plurality of convexities which will be utilized as optical recording pit. The recording pits formed in this way are detected by presence or absence of reflection of radiated light whereby the content of optical recorded informations can be read. The optical recording pits are not deformed further irrespective of how long a reading light comprising laser beam having a density of energy less than the threshold is repeatedly radiated to the optical pits. Accordingly, any reduction of S/N ratio of a signal does not take place as time elapses.

4 Claims, 3 Drawing Sheets

F I G. 1
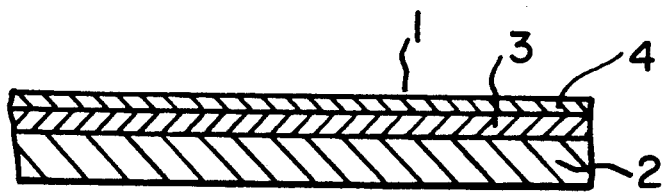
F I G. 2
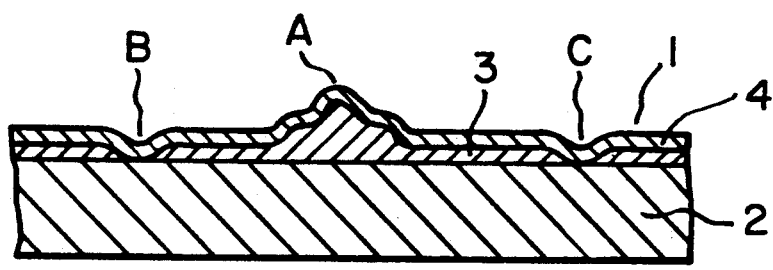
F I G. 4
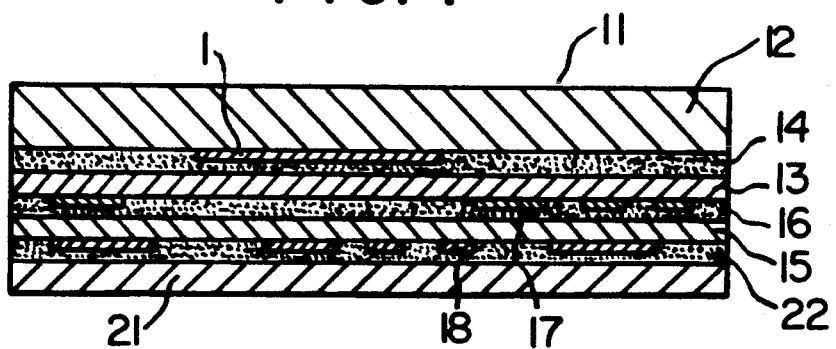
F I G. 5
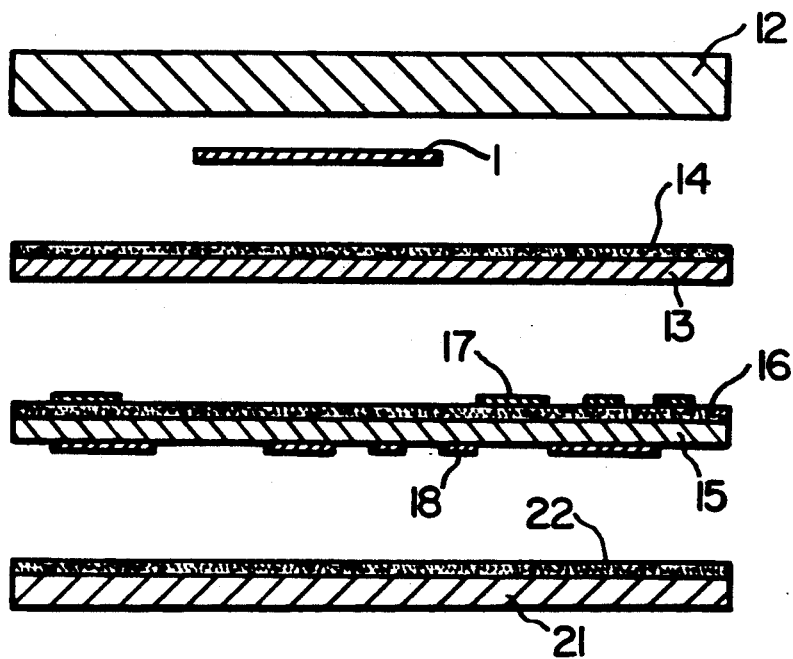

OPTICAL RECORDING MEDIUM, METHOD OF PRODUCING THE SAME AND METHOD OF PRODUCING THE OPTICAL RECORDING CARD

BACKGROUND OF THE INVENTION

1. Field of the Invention

The present invention relates to an optical recording medium, a method of producing the same and a method of producing an optical recording card, and more particularly to a writable type (DRAW type) optical recording medium, a method of producing the same and a method of producing an optical recording card.

The optical recording medium is used when sound, image and other type of signal are recorded optically, and it is utilized in the form of a disc or card. In the recent years, a card in which various kinds of informations are recorded are widely put in practical use as ID card, cash card or bank card.

2. Prior Art

A disc having an optical recording medium incorporated therein is widely used as a recording member in which digital signals relative to sound and image are recorded. This kind of card is required to record various kinds of informations such as individual data, data concerning an issuance company or the like. In the earlier age, such kinds of informations were recorded using visual characters and symbols and in the later age they are recorded using electrical signals which are produced with the aid of magnetism. However, in a case where magnetism recording medium is used, recorded informations are easy to be falsified. Accordingly, there is a need of taking adequate actions for preventing recorded informations from being falsified and moreover dealing with the current increased quantity of informations to be recorded.

To this end, an optical recording card to which laser technique is applied has been lately developed. This optical recording card is such that it is provided with an information recording medium which has an optical reflection surface. Lately, a writable type (DRAW type) information recording medium has been required in addition to a conventional read only memory type (ROM type) recording medium.

As shown in FIG. 7, a conventional DRAW type optical recording card 101 is so constructed that a gelatine layer 103 with silver gains serving as optical recording medium is formed on a transparent card front board 102, a transparent film 105 having printed patterns 104 formed thereon is adhesively secured to the bottom surface of the gelatine layer 103 with silver grains with the use of a transparent adhesive 106 and a card rear board 107 is adhesively secured to the bottom surface of the transparent film 105 as viewed in the drawing with the use of a transparent adhesive 108.

A laser beam for the purpose of writing is introduced from a card front board 102 side to melt the gelatine layer 103 with silver grains, causing the non-reflective layer to be exposed to the outside, whereby a pit is formed in which informations are recorded. Reading of the recorded informations is achieved by discriminating "0" from "1" in dependence on an intensity ratio of reflected lights from the pit and the gelatine layer 103 with silver grains.

A structure of the DRAW type optical recording medium and a method of producing the same are disclosed, for instance, in an official gazette of Japanase Patent Publication NO. 23716/1984. However, in the conventional optical recording medium, silver halide emulsion is used for forming the gelatine layer 103 with silver grains and formation of the latter requires strict control relative to developing conditions and many complicated steps of exposing and developing, resulting in it being produced at an expensive cost. Further, the conventional optical recording medium is such that the recording portion is circularly recessed under the effect of energy of laser beam and the non-reflective layer is exposed to the outside to build a recording part. In the conventional optical recording medium, an intensity of reading light is weak in the range of 1/5 to 1/10 of that of recording light but the non-recording portion is brought in a state close to the recording portion under the influence of accumulative energy with the result that a ratio of S/N is reduced and preservability of recorded informations is degraded. As another optical recording medium, there are known those that utilize metallic brightness of cyanine dyestuff film and absorbability of laser beam and those that are so constructed that PVA or gelatine layer serving as a photosensibility increasing layer is superposed on the cyanin dyestuff film in a contacted state. In these cases, in order to effect preformatting, patterning of the dyestuff film or patterning of the reflection amplifying film is required, resulting in a process of production becoming complicated. Also in these cases, the above-mentioned materials are used as recording material by utilizing their thermal deformation, fading, decomposition or the like but reduction of S/N is brought about as weak reading light is repeatedly radiated by many times. Consequently, reservability of recorded informations is degraded.

Accordingly, it is preferable that an optical recording medium is not material which continuously varies relative to beam power but it is material with which presence and absence of recorded informations is recognized in the presence of a certain "threshold".

DISCLOSURE OF THE INVENTION

The present invention has been made with the foregoing background in mind and its object resides in providing an optical recording medium which has an excellent reservablity of recorded informations and is easy to be produced and with which preformatting is easily effected, a method of producing the aforesaid optical recording medum and a method of producing an optical recording card with the use of the optical recording medium.

To accomplish the above object, there is provided according to a first aspect of the invention an optical recording medium, wherein a base board, a silver grain layer containing a large number of fine silver grains therein, the silver grain layer being located on the base board, and a coloring matte layer containing coloring matter which has an ability of absorbing near-infrared ray, the coloring matter layer being located on the silver grain layer, are superposed one above another to build a layered structure.

Further, there is provided according to a second aspect of the invention a method of producing an optical medium, wherein the method comprises the steps of forming a silver grain layer containing silver grains, blackening a photosensitive member comprising silver grain layer by allowing the photosensitive member to be exposed to light, developed and fixed and forming coloring matter layer containing a coloring matter which has an ability of absorbing nea-infrared ray, the coloring matter layer being located on the silver grain layer.

Further there is provided according to a third aspect of the invention a method of producing an optical recording card, wherein the method comprises the steps of temporarily adhering to a transparent card front board an optical recording medium including a silver grain layer containing a large number of fine silver grains and a coloring matter layer containing coloring matter which has an ability of absorbing near-infrared ray on a base board to build a layered structure in such a manner that the coloring matter layer faces the card front base board, adhering a first intermediate layer to the coloring matter layer side of the card front board, adhering a second intermediate layer to the first intermediate layer and adhering a card rear board to the second intermediate layer.

When laser beam is radiated to the optical recording medium from the coloring matter layer side, both the silver grain layer and the coloring matter layer located at a radiated part are deformed to a convex configuration to build an information pit, provided that a density of radiated energy is higher than a predetermined threshold. Thus, it is possible to carry out optical recording. Next, when optically recorded informations are read, laser beam having a density of energy less than the threshold is radiated from the coloring matter layer side and the convex type information pit is detected in dependence on presence and absence of reflected light. Thus, the content of optically recorded informations can be read.

Further, an optical recording card can be easily produced in such a manner that the optical recording medium as described above is interposed between the card front board and the card rear board both of which are adhered to one another.

BRIEF DESCRIPTION OF THE DRAWINGS

FIG. 1 is a fragmental enlarged vertical sectional view of an optical recording medium.

FIG. 2 is a fragmental enlarged vertical sectional view of the optical recording medium in FIG. 1, particularly illustrating deformation thereof.

FIG. 4 is a fragmental enlarged vertical sectional view of an optical recording card.

FIG. 5 illustrates the steps of producing the optical recording card in FIG. 4.

BEST MODE FOR CARRYING OUT THE INVENTION

Figure 3A:
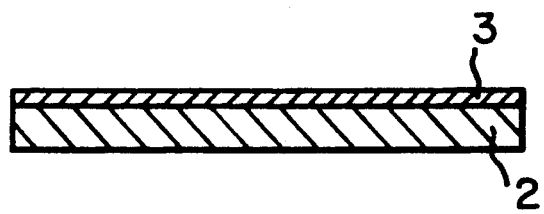
FIGS. 3(a) to (d) illustrate the steps of producing the optical recording medium.
Figure 3B:
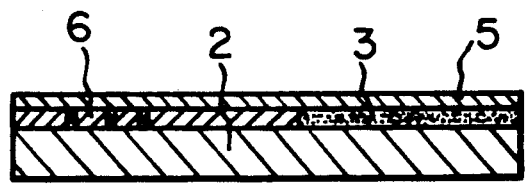

Now, the present invention will be described in a greater detail hereunder with reference to the accompanying drawings which illustrate a preferred embodiment thereof.

In FIG. 1 reference numeral 1 designate an optical recording medium. The optical recording medium 1 includes a silver grain layer 3 and a coloring matter layer 4 both of which are placed on a base film 2 in a layered structure.

The silver grain layer 3 contains silver halide which is to be blackened when they are exposed to light beam, developed and fixed. The silver grain layer 3 is constituted by a coated film comprising dried photographic emulsion. The photographic emulsion is such that granular silver halide (silver bromide or silver chloride) is dispersed in liquidity gelatine in the form of suspension. An example of a fundamental process for preparing photographic emulsion will be noted below.

| first solution: | ammonium bromide 1N solution | 10 cc |
| | potassium iodide 1N solution | 0.5 cc |
| | gelatine | 6 g |
| | distilled water | 40 cc |
| second solution: | silver nitrate 1N solution | 10 cc |

Both the first and second solutions are maintained at a temperature of 50° C. and the second solution is added to the first solusion. In this way a required silver halide emulsion is obtained and when it is kept at a temperature of 50° C. for a period of one hour, it follows that silver bromide grains grow. The emulsion becomes solidified after it is kept unchanged for a period of full one day, and it is then subjected to cutting and water washing. Thereafter, it is heated again at a temperature of 50° C. for a period of suitable hours so as to increase its sensivility, and it is coated and dried on the base film 2 while having a film thickness of 4 microns. For instance, a polyester film having a thickness of 0.1 mm is employed for the base film 2. A photographic film can be utilized as a combination of the base film 2 and the silver grain layer 3.

A role or function of the silver grain layer 3 is to promote deformation of the coloring matter layer 4 due to the fact that if the coloring matter layer 4 is constituted merely by a single layer, it is less deformed when it is exposed to laser beam for the purpose of recording and writing. In contrast with a transparent silver grain layer 3, a darkened silver grain layer 3 absorbs light which permeates through a film of dyestuff, improved sensivility is assured. The silver grain layer 3 has a thickness in the range of 0.05 to 100 microns and preferably it has a thickness in the range of 0.1 to 10 microns.

Next, description will be made below as to the coloring matter layer 4.

A role or function of the coloring matter layer 4 is to absorb and reflect of light. As a function of absorbing light, the coloring matter layer 4 absorbs writing means (laser beam or the like) at a high efficiency whereby a writing sensibility is improved. On the other hand, as a function of reflecting light, the coloring matter layer 4 suitably reflects reading light and writing light and thereby automatic focussing and reading of written pits can be conducted. The coloring matter layer 4 has an ability of selectively absorbing near-infrared ray as a necessary nature and moreover it is required that it has a suitable reflectivity. As a dyestuff satisfying such a nature of the coloring matter layer as mentioned above, cyanin based, phthalocyanin based, methyn based, merrocyanin based, aluminum based coloring matter bisphenildithiol Ni complex or the like will be noted here. In a case of 830 nm, IR-820 (produced by Nippon Kayaku Co., Ltd.), NK-125, NK-2014, NK-2865 (each of them being produced by Nippon Kanko-Shikiso Kenkyusho Co., Ltd), PA-1005, PA-1006 (each of them being produced by Mitsui Toatsu Chemicals, Inc.) or the like are employable, and in a case of 780 nm, NK-125 (produced by Nippon Kanko-Shikiso Kenkyusho Co., Ltd.), CY-2, CY-9(each of them being produced by Nippon Kayaku Co., Ltd) or the like are employed. Moreover, their mixture is also effectively employable.

Formation of the coloring matter layer is carried out by spin coating, roll coating, dip coating, gravure coating, silk screen printing or the like process, provided that a dyestuff employed therefor has an excellent dissolubility. However, when it has less dissolubility, vacuum depositing or the like process may be utilized.

With respect to a film thickness of the coloring matter layer, the latter has a thickness in the range of 50 to 2000 angstroms, when the film is constituted by dyestuff only. And, it should be noted that resin may be added to dyestuff. In this case, a compounding ratio of resin in the coloring matter layer is represented by 0 to 90% by weight, preferably 0 to 70% by weight and it is suitable that it has a thickness in the range of 100 angstroms to 1.0 micron.

Resin employable for the coloring matter layer is selected from a variety of self-oxidative resins and thermoplastic resins such as nitrocellose based resin, acrylic resin, polyester based resin, polyvinyl chloride based resin, polyvinyl acetate based resin, polystyrene based resin, polyvinylbutyral based resin or the like.

It has been found from results of experiments conducted that the optical recording medium as constructed in the above-described manner has the following nature. Namely, it has been found that a radiated part varies in shape in dependence of an amount of radiated energy, when semiconductor laser is radiated from the coloring matter layer 3 side to the optical recording medium 1 of which silver grain layer 3 has been subjected to exposure and development and becomes blackened. The shape of the radiated part varies in such a manner that it exhibits concavity as represented by reference characters B and C in FIG. 2 when a density of radiated energy is less than the boundary and it exhibits convexity as represented by reference character A in FIG. 2 when a density of radiated energy is higher than the boundary, wherein the boundary is identified by 3 to 4 mW/5 $\mu$m$\phi$ (half-amplitude level). An occurrence of variation of shape to convexity requires temporary high energy but variation to convexity does not take place irrespective of how many times laser having a lower energy is radiated thereto.

On the other hand, in a case where the silver grain layer 3 is not blackened, it follows that the radiated part becomes concave as represented by reference character C in FIG. 2. However, if deformation to convex configuration takes place, the convex configuration can be utilized as optical recording means by detecting it with the use of reading light.

As will be apparent from the above description, the optical recording medium of the invention is merely such that a silver grain layer and a coloring matter layer are formed on the base film and a combination of the base film and the silver grain layer can be obtained by utilizing a commercial photographic film. Therefore, it can be very easily produced.

Since the convexly deformed portion on the radiated part is developed as shown by refrence character A in FIG. 2 only at the time when laser light having a density of energy higher than a predetermined level is radiated temporarily, it follows that energy is only accumulated in the convexly deformed portion without any occurrence of further deformation of the convexly deformed portion irrespective of how repeatedly reading light having a lower density of energy is radiated thereto. Accordingly, there do not occur gradual reduction of reading accuracy and reduction of a ratio of S/N.

EXAMPLE OF EXPERIMENT

Figure 6A:
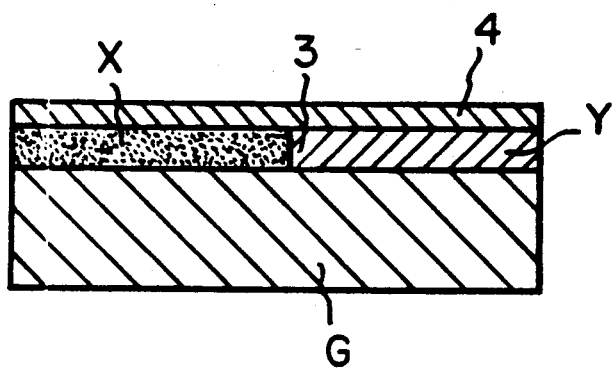
FIGS. 6 (a) to (c) illustrate a test specimen used for an experiment respectively.
Figures 6B, 6C:
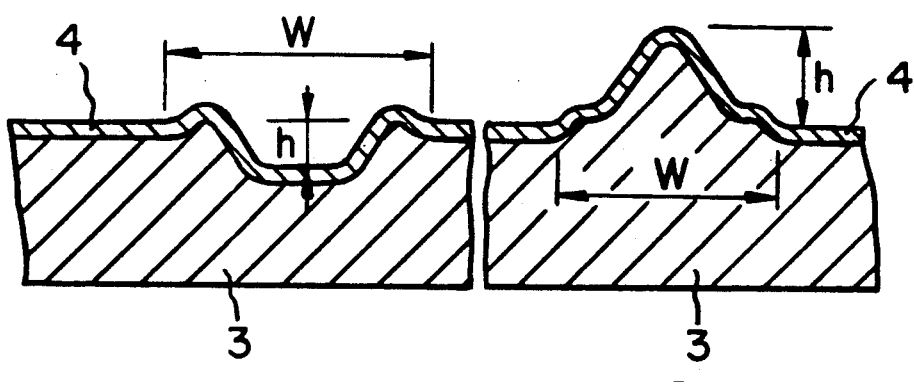
Figure 7:
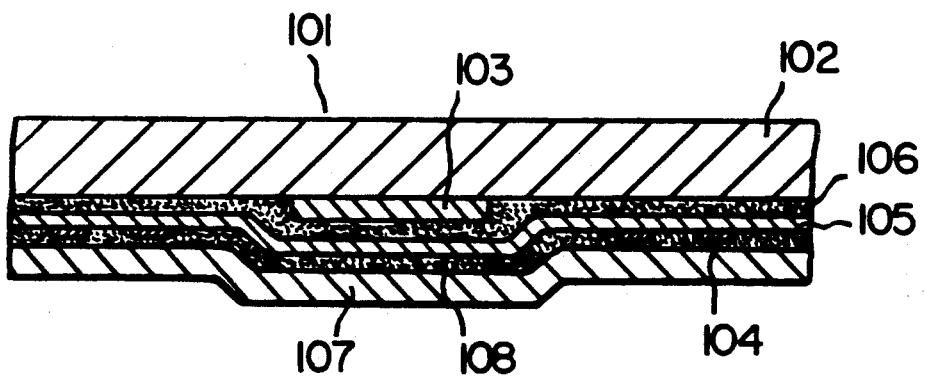
FIG. 7 is a fragmental enlarged vertical sectional view of a conventional optical recording card.

As shown in FIG. 6, the photographic emulsion was coated on a base board G made of glass by spin coating and it was then dried. Thereafter, masking was effected from the base board side and the coated base board was subjected to exposing, developing and fixing in such a manner that one half of the gelatine layer X was blackened to form a blackened part and other half of the same Y was not subjected to exposing to form a tranaparent part. Next, dyestuff solusion was coated from the above of the gelatine layer (under conditions of 20 mg/cc, 1000 rpm and 40 sec.) to constitute a coloring matter layer whereby a test specimen was prepared (see FIG. 6(a)). By repeating the above operations, four kinds of test specimens (test specimen 1, test specimen 2, test specimen 4 and test specimen 4) were prepared. Laser was radiated from the above of the coloring matter layer of each of the four kinds of test specimens to scan both the blackened part and the transparent part. As a result, a convex configuration as shown in FIG. 6(c) was formed on the coloring matter layer in the blackened part, while a concave groove as shown in FIG. 6(b) was formed on the coloring matter layer in the transparent part. Results of the experiments are shown in the following table.

It was found that traces were formed by radiation of laser and they could be utilized as a pit for the purpose of optical recording.

Recording Conditions

| Wavelength of semiconductor laser | 830 (nm) |
| diameter of spot (half-amplitude level) | 5 ($\mu$m$\phi$) |
| scanning speed | 5 (mm/sec) |

Results of Experiments

| | Results of experiments | | | |
|---|---|---|---|---|
| | test specimen 1 | test specimen 2 | test specimen 3 | test specimen 4 |
| energy of radiation (mW) | 1.5 | 3.0 | 5.5 | 8.3 |
| width W of convexity in darkened part ($\mu$m) | 15.00 | 20.00 | 28.00 | 33.00 |
| height h of convexity in darkened part ($\mu$m) | −0.20 | −0.20 | +0.05 | +1.50 |
| width W of groove in transparent part ($\mu$m) | 9.00 | 11.00 | 15.00 | 17.00 |
| height h of groove in transparent part ($\mu$m) | −0.02 | −0.07 | −0.100 | −0.13 |

Next, a solution comprising cyclohexanone-1.2-dichloroethane (1:1 weight ratio) with IR-820+IRG-300 (1:1 weight ratio) dispersed therein at a rate of 20 mg/cc was coated on HRP (high resolution plate) by spin coating under conditions of 1000 rpm and 30 sec. to form a dyestuff film. Writablity and reflectivity at 830 nm for the test specimens are shown in the following table. As is apparent from a comparision between the test speciment 2) and the test specimen 4), it is found that line drawing (writing for optical recording) can be clearly carried out in the presence of the coloring matter layer and the latter was very advantageous for writing in the form of optical recording.

Recoding Conditions

| Recoding conditions | |
| --- | --- |
| wavelength of semiconductor laser | 830 (nm) |
| diameter of spot (half-amplitude level) | 5 (μmφ) |
| scanning speed | 5 (mm/sec) |
| film thickness of transparent part | 4.2 microns |
| silver grain layer darkened part | 5.0 microns |

| writing power (mW) | black[1] | transparent[2] | dye/black[3] | dye/transparent[4] |
| --- | --- | --- | --- | --- |
| 8.2 | O | X | O | O |
| 5.0 | O | X | O | O |
| 3.0 | O | X | O | O |
| 1.5 | O | X | O | O |
| 0.5 | O | X | O | Δ |
| reflectivity (%) at 830 nm | 4 | 4 | 18 | 19 |

[1] blackened silver grain layer on HRP which was subjected to exposing, developing and fixing
[2] transparent silver grain layer on HRP which was subjected to exposing, developing and fixing
[3] surface of the test specimen 1) with the dyestuff film formed thereon
[4] surface of the test specimen 2) with the dyestuff film formed thereon
Evaluation
O: Line drawing could be conducted.
Δ: A trace remaind.
X: No variation took place.

DESCRIPTION ON METHOD OF PRODUCING AN OPTICAL RECORDING MEDIUM

Structure

Production of the optical recording medium 1 as described above will be carried out in the following manner.

First, as shown in FIG. 3, a silver grain layer 3 is formed on a base film 2 having a thickness of 0.1 mm whereby a lith film is prepared (see FIG. 3(a)).

Figure 3C:
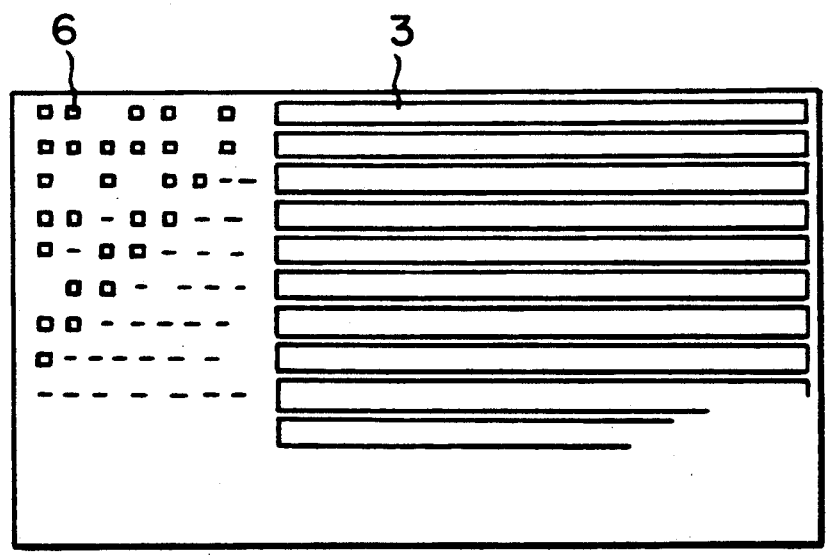

Next, in order that a preformat portion 6 and a optical recording portion 8 both of which are usable for optical recording are blackened using a mask 5, they are subjected to exposing and they are then developed and fixed (The preformat portion 6 and the optical recording portion 8 after completion of developing and fixing are as shown by a vertical sectional view of FIG. 3 (b) and a plan view of FIG. 3(c)).

Figure 3D:
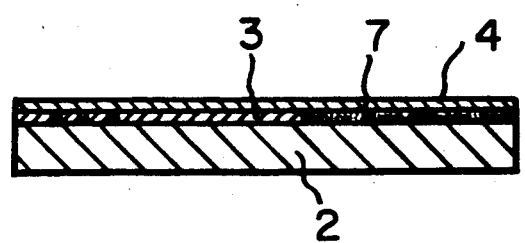

Next, a dyestuff solution is coated on the blackened silver grain layer 3 by roll coating and it is then dried to build a coloring matter layer 4 (see FIG. 3(d)).

Now, production of the optical recording member is completed.

As dyestuff solution, a 1% anone solution which is obtained by diluting a mixture liquid comprising IR-820 and IRG-003 by a ratio of 2:1 can be used.

Advantageous Effect

When the above-described method of producing an optical recording medium is employed, a hitherto established photographic technique having an excellent reliability can be utilized as it is. Thus, a required optical recording medium can be easily produced, while maintaing a high quality.

DESCRIPTION ON A METHOD OF PRODUCING AN OPTICAL RECORDING CARD

Structure

First, the optical recording medium 1 as constructed in the above-described manner is cut to a predetermined size so that it is used for an optical recording card.

As shown in FIG. 4, an optical recording card 11 is so constructed that a front board 12 and a first intermediate layer 13 are adhered to one another with the use of an adhesive 14 with the optical recording medium 1 interposed therebetween. A transparent polycarbonate having a thickness of about 400 microns can be used for the front board 12. Similarly, a transparent polycarbonate having a thickness of about 50 microns can be used for the first intermediate layer 13.

An UV setting type adhesive can be used for the adhesive 14, while having a thickness of about 20 microns. A second intermediate layer 15 is adhered to the bottom surface of the first intermediate layerb 13 as viewed in the drawing with the use of an adhesive 16. Necessary printed parts 17 are provided on the adhesive 16 using an UV setting type ink, while necessary printed parts 18 are similarly provided on the second intermediate layer 15 using an UV setting type ink.

The second intermediate layer 15 is constituted by polycarbonate having a thickness of about 200 microns and a thermoplastic adhesive can be used for the adhesive 16 by a thickness of about 20 microns.

A rear board 21 is adhered to the bottom surface of the second intermediate layer 15 as viewed in the drawing using an adhesive 22. Polycarbonate having a thickness of about 50 microns can be used for the rear board, while thermoplastic adhesive can be used by a thickness of about 20 microns for the adhesive 22.

A method of producing an optical recording card as described above is carried out in the following manner.

First, as shown in FIG. 5, the optical recording medium 1 is temporalily secured to a front board 12. Next, an UV setting type adhesive 14 is coated on a first intermediate layer 13. Next, the front board 12 is superposed on the first intermediate layer 13 and ultraviolet ray is radiated to the layered structure so that the front board 12 is adhered to the first intermediate layer 13. Next, an thermoplastic adhesive 16 is coated on a second intermediate layer 15. Next, printed parts 17 and 18 are placed on both the surfaces of the second intermediate layer 15 using UV setting type ink. Next, a thermoplastic adhesive 22 is coated on a rear board 21. Next, the layered structure of the front board 12 and the first intermediate layer 13, the second intermediate layer 15 and the rear board 21 are superposed one above another in a laminated structure whereby a required optical recording card 11 is built.

Advantageous Effect

In accordance with the above-described method of producing an optical card, the optical recording medium 1 is handled in such a manner that it is clamped between the front board 12 and the first intermediate layer 13. Thus, there is no fear that the optical recording medium 1 is deteriorated or degraded during production of the optical recording card. Consequently, an optical recording card including recorded portions having a high degree of cleanliess can be obtained. Further, if a layered structure comprising a front board, an optical recording medium and a first intermediate layer which are superposed one above another is previously provided, a various kinds of optical recording cards can be produced merely by preparing a second intermediate layer on which necessary printing is effected in dependence on a required kind of product and adhering it to the aforesaid layered structure later. In view of the fact as mentioned above, it is possible to carry out production in small lot, resulting in the optical recording card being produced at an inexpensive cost.

What is claimed is:

1. A method of producing an optical recording medium in which an intensity of reading light is below a recording threshold of the medium and in a range of 1/5 to 1/10 of that of recording light, said recording medium consisting essentially of a layer of coloring matter superposed on a photosensitive member, wherein said method comprises the steps of forming a photosensitive member comprising a photographic emulsion layer containing silver halide grains, said photographic emulsion layer being located on a base board, blackening said photosensitive member to release silver grains by exposing said photosensitive member to light, silver halide grains of said photosensitive member being suspended in said emulsion, developing and fixing said photosensitive member, and forming a coloring matter layer constituted by dyestuff only which has a thickness in the range of 50 to 2000 angstroms and has an ability of absorbing near-infrared radiation, said coloring matter layer being located on the photographic emulsion layer.

2. A method of producing an optical recording card in which an intensity of reading light is below a recording threshold of the medium and in a range of 1/5 to 1/10 of that of recording light, wherein said method comprises the steps of temporarily adhering to a transparent card front board an optical recording medium including a photographic emulsion layer containing a suspension of fine silver halide grains in said emulsion and a coloring matter layer constituted by dyestuff only, said coloring matter layer having a thickness in the range of 50 to 2000 angstroms and having an ability of absorbing near-infrared radiation, said adhering step placing said photographic emulsion layer and said coloring matter layer on a base board to build a layered structure in such a manner that said coloring matter layer faces said card front board, adhering a first intermediate layer to the coloring matter layer side of said card front board, adhering a second intermediate layer to said first intermediate layer and then adhering a card rear board to said second intermediate layer.

3. An optical recording card in which an intensity of reading light is below a recording threshold of the medium and in a range of 1/5 to 1/10 of that of recording light comprising a transparent card front board, and an optical recording medium adhered to said card front board;

a first intermediate layer adhered to said optical recording medium, a second intermediate layer adhered to said first intermediate layer, and a card rear board adhered to said second intermediate layer;

wherein said card front board and said optical recording medium and said first intermediate layer and said second intermediate layer and said card rear board are superposed one above another to build a layered structure;

said optical recording medium comprises a base board and a photographic emulsion layer which has a thickness in a range of 0.1-10 microns and which includes a suspension of fine silver halide grains in said emulsion, the photographic emulsion layer being located on the base board; and said optical recording medium further comprises a coloring matter layer constituted by dyestuff only which has a thickness in the range of 50-2000 angstroms and has an ability of absorbing near-infrared radiation, the coloring matter layer being located on the silver grain layer, the base board and the photographic emulsion layer and the coloring matter layer being superposed one above another to form a layered structure wherein said coloring matter layer faces said card front board.

4. An optical recording medium in which an intensity of reading light is below a recording threshold of the medium and in a range of 1/5 to 1/10 of that of recording light consisting essentially of a base board, a photographic emulsion layer and a coloring matter layer;

wherein said photographic emulsion layer comprises a suspension of fine silver halide grains, said photographic emulsion layer being located on the base board;

the coloring matter layer constituted by dyestuff only which has a thickness in the range of 50 to 2000 angstroms and has an ability of absorbing near-infrared radiation, the coloring matter layer being located on said photographic emulsion layer;

said photographic emulsion layer and the coloring matter layer are superposed one above another to build a layered structure, at least a part of the photographic emulsion layer being blackened by exposure to light followed by developing and fixing, wherein at least another part of the said photographic emulsion layer is blackened by exposure to light to build an optical recording portion; and said optical recording medium has a threshold level of light energy density of at least 3 mW/5 $\mu m\phi$ for deformation of said optical recording medium.

* * * * *